United States Patent
Iversen et al.

(10) Patent No.: US 10,954,039 B1
(45) Date of Patent: Mar. 23, 2021

(54) PACKAGED PET FOOD PRODUCT AND METHOD OF DISPENSING

(71) Applicant: Blue Buffalo Enterprises, Inc., Wilton, CT (US)

(72) Inventors: Jacqueline Iversen, Minneapolis, MN (US); Anthony W Swenson, Blaine, MN (US); Tal A Tostenson, Rogers, MN (US)

(73) Assignee: Blue Buffalo Enterprises, Inc., Wilton, CT (US)

( * ) Notice: Subject to any disclaimer, the term of this patent is extended or adjusted under 35 U.S.C. 154(b) by 0 days.

(21) Appl. No.: 16/863,514

(22) Filed: Apr. 30, 2020

(51) Int. Cl.
*B65D 35/28* (2006.01)
*B65D 85/72* (2006.01)
*B65D 35/44* (2006.01)
*A23K 50/48* (2016.01)

(52) U.S. Cl.
CPC ............. *B65D 35/28* (2013.01); *A23K 50/48* (2016.05); *B65D 35/44* (2013.01); *B65D 85/72* (2013.01)

(58) Field of Classification Search
CPC .... B65D 35/28; B65D 35/44; B65D 47/2031; B65D 47/043; A23K 50/48
USPC .............................. 222/153.14, 92, 107, 215
See application file for complete search history.

(56) References Cited

U.S. PATENT DOCUMENTS

| | | | |
|---|---|---|---|
| 3,946,123 A | 3/1976 | Hanna | |
| 6,176,399 B1 * | 1/2001 | Schantz | B65D 47/2031 222/484 |
| 6,732,888 B1 * | 5/2004 | Smiley | B65D 1/32 222/129 |
| 8,844,767 B1 * | 9/2014 | Bates | B65D 47/2031 |
| 9,060,918 B1 * | 6/2015 | Tomassini | A61J 11/0055 |
| 10,399,750 B1 * | 9/2019 | Latour | B65D 47/0809 |
| 2003/0015144 A1 | 1/2003 | Bennett et al. | |
| 2010/0147885 A1 * | 6/2010 | Braxton | B65D 35/38 222/106 |
| 2018/0168126 A1 | 6/2018 | Gibbs | |
| 2020/0148454 A1 * | 5/2020 | Black | B65D 83/0055 |

FOREIGN PATENT DOCUMENTS

EP 0440328 A2 8/1991
WO WO-2018/230460 A1 * 12/2018 ......... B65D 47/2031

* cited by examiner

*Primary Examiner* — Lien M Ngo
(74) *Attorney, Agent, or Firm* — Diederiks & Whitelaw, PLC; Annette M. Frawley, Esq.

(57) ABSTRACT

A packaged wet pet food product comprises a flexible container body and an integrated dispenser head for the storing and dispensing of wet pet food, specifically wet cat food or wet dog food. The flexible container body can be manually grasped and squeezed in order to deform the container body and force wet pet food stored therein to be forced through a series of exit ports formed in the dispenser head. The exit ports combine to essentially define a sieve, with the wet pet food automatically breaking into randomly sized pieces or extruded sections during dispensing, thereby advantageously avoiding the need to separately chop the pet food apart prior to consumption. The package is preferably sized to store enough pet food for multiple feedings, with the dispenser head including a cap or cover for sealing the container between uses.

18 Claims, 3 Drawing Sheets

US 10,954,039 B1

PACKAGED PET FOOD PRODUCT AND METHOD OF DISPENSING

BACKGROUND OF THE INVENTION

The present invention pertains to the field of food for pets and, more particularly, to the packaging and dispensing of wet pet food products.

Pet food products are known to be packaged in a variety of ways, mainly based on the type of food being packaged. In the case of wet pet food, specifically wet cat food or wet dog food, steel and aluminum cans are a common choice of packaging. When the wet pet food is served, consumers typically scoop the food from the can and place it into or onto a bowl, dish or plate, for example, where the food is then manually broken up. This requires a spoon or fork, both for the serving and the chopping. However, many consumers would prefer not to use a utensil for this task, particularly a utensil that they themselves also use. Because of this issue, many pet owners will purchase a few separate utensils to be dedicated as pet food utensils. At the very least, this process results in additional dirty utensils that must be cleaned. Even with the use of separate utensils, a significant percentage of pet owners simply do not like dealing with serving meals to a pet in this manner. This issue can be magnified as one pet food can may actually contain multiple servings so that the pet owner may only wish to serve part of the can's contents, thereby creating other issues associated with re-packaging and storing of the remaining contents. Based on the above, it would be desirable to provide a way for consumers to serve wet pet food with a less hands-on approach.

SUMMARY OF THE INVENTION

The present invention achieves the above goals through the use of a flexible pet food packaging that is readily deformable by hand, with the deformation causing the contents of the packaging to exit the packaging. Additionally, the packaging is configured to such that dispensing from the packaging functions to automatically break up the contents being dispensed.

More specifically, the invention is directed to a packaged wet pet food product comprises a flexible container body and an integrated dispenser head for the storing and dispensing of wet pet food, specifically wet cat food or wet dog food. Although various embodiments are possible, the flexible container body preferably takes the form of a pouch which can be manually grasped and squeezed in order to force wet pet food stored therein through a series of exit ports formed in the dispenser head. That is, given its flexible nature, the container body is configured to be readily deformable by one or more hands of a user to reduce a volume of an internal pet food storage chamber, and reducing the volume of the storage chamber causes the wet pet food to be forcibly extruded from the exit ports of the dispenser head. The exit ports combine to essentially define a sieve, with the wet pet food breaking up into pieces or extruded sections during dispensing, thereby advantageously avoiding the need to separately chop the pet food prior to consumption. The package is preferably sized to store enough pet food for multiple feedings, with the dispenser head including a cap or cover for selectively sealing the container between uses.

Based on the above, it should be evident that use of the packaged pet food product of the invention eliminates the need for pet owners to open wet pet food cans, scoop wet pet food from the cans, separately chop the wet pet food, clean used utensils, or look to ways to store used portions of the pet food remaining in the can between feedings. In any case, additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting but merely as a representative basis for teaching one skilled in the art how to construct and employ the present invention.

As discussed above, pet food, specifically wet cat food or dog food, is commonly packaged in steel and aluminum cans. In accordance with the invention, "wet" pet food contains 60% or greater, generally between 60-78%, water so as to significantly higher in moisture than dry or semi-moist pet food. As discussed above, to serve such wet pet food, a consumer would historically use a separate utensil to scoop or otherwise remove the pet food from a can and then to subsequently break up the pet food prior to consumption. In some cases, only a portion of the pet food is removed from the can, requiring the can to be somehow sealed between uses as the contents would need to be refrigerated. This process necessitates the cleaning of the utensil and, for some consumers, a dedicated pet food utensil. The present invention was developed to avoid the problems associated with this known pet feeding operation.

Figure 1:
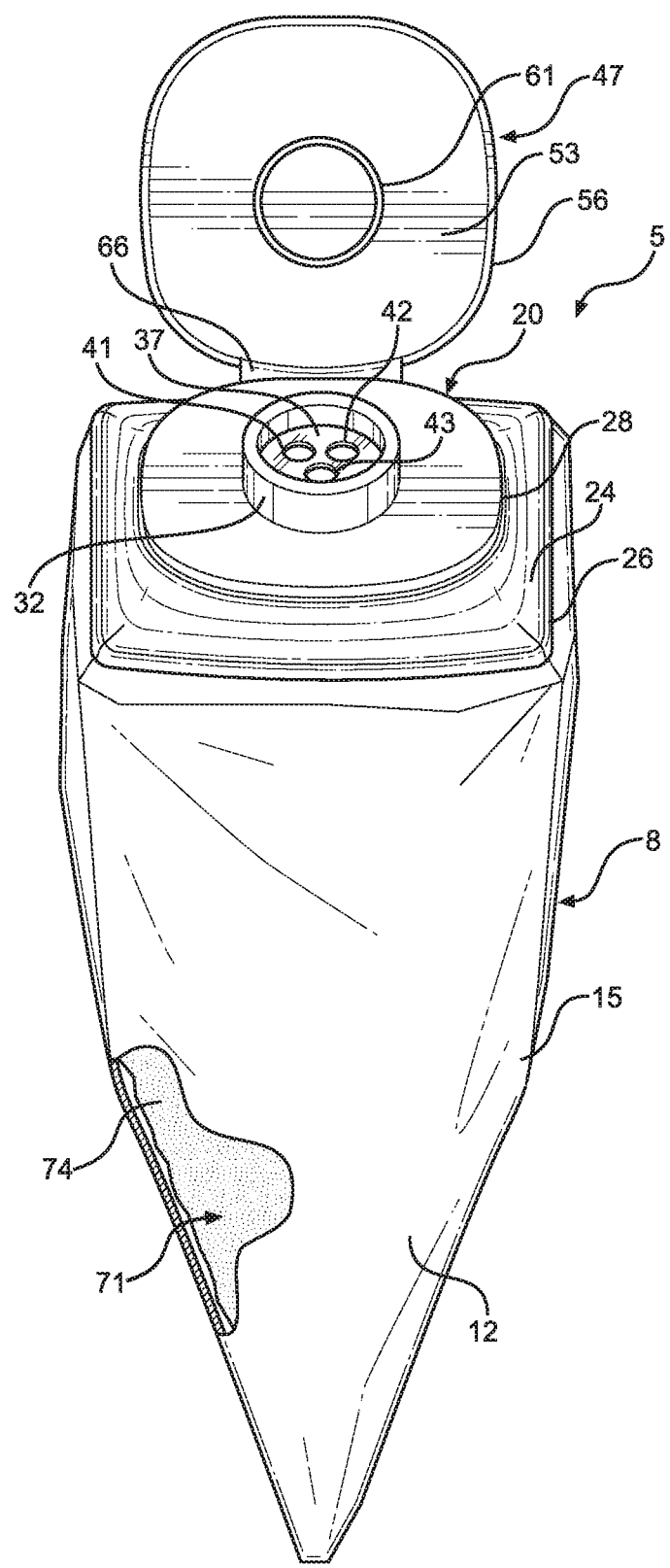
FIG. 1 is a perspective view of a pet food package having a flexible container body and a dispenser head constructed in accordance with the present invention.

With reference to FIG. 1, a wet pet food packaging container is generally indicated at 5. As shown, packaging container 5 includes a flexible container body or pouch 8 having a lower body portion 12 and an upper body portion 15. The material employed for flexible container body 8 can greatly vary, so long as the material is flexible so as to enable container body 8 to be readily deformed through squeezing, while also be impermeable to liquids, i.e., waterproof so that liquids could be retained in container body 8 without leaking. By way of examples, these materials can include one or more of plastics, foils, recyclable or compostable materials like bioplastics, mono or laminate materials, and the like. In the embodiment shown, lower body portion 12 tapers from upper body portion 15 while an open upper end (not separately labeled) of upper body portion 12 is secured to a dispenser head assembly generally indicated at 20.

In the embodiment shown, dispenser head assembly 20 includes a base plate 24 having a peripheral edge portion 26. Upper body portion 15 of container body 8 extends beneath peripheral edge portion 26 and is secured either directly or indirectly, such as through adhesion, welding or the like, in a fluid tight manner to base plate 24. Base plate 24 leads to a raised platform 28 having an upstanding central ring 32 which, in the example shown, is circular in shape. Within central ring 32 is a bottom wall 37 formed with a plurality of exit ports 41-43. In accordance with most preferred embodiments of the invention, exit ports 41-43 are adjacent one another, but spaced. On the other hand, it is possible for respective ones of the exit ports 41-43 to overlap. In addition, the particular number of exit ports can vary from at least two, preferably at least three, and potentially more, (collectively a plurality of exit ports) with the number being dependent on the size of base plate 24 and the composition of the food to be dispensed as will be discussed further below.

Hingedly attached to base plate 24 is a cap or cover 47. Cap 47 includes a main body portion 53, a peripheral downturned sidewall portion 56 and a central, annular sealing member 61. Extending from one or more of main body portion 53 and sidewall portion 56 is a hinge member 66. Dispenser head assembly 20 is preferably integrally molded of plastic such that hinge member 66 is actually a living hinge. When cap 47 is pivoted from the position shown in FIG. 1, annular member 61 extends about central ring 32 to create a seal for packaging container 5. In any case, for purposes of the invention, flexible container body 8 defines a storage chamber (generally indicated at 71) which houses wet pet food 74 which can only be dispensed by squeezing flexible container body 8 to force the extrusion of wet pet food 74 through exit ports 41-43 as will be detailed more fully below.

Figure 2:
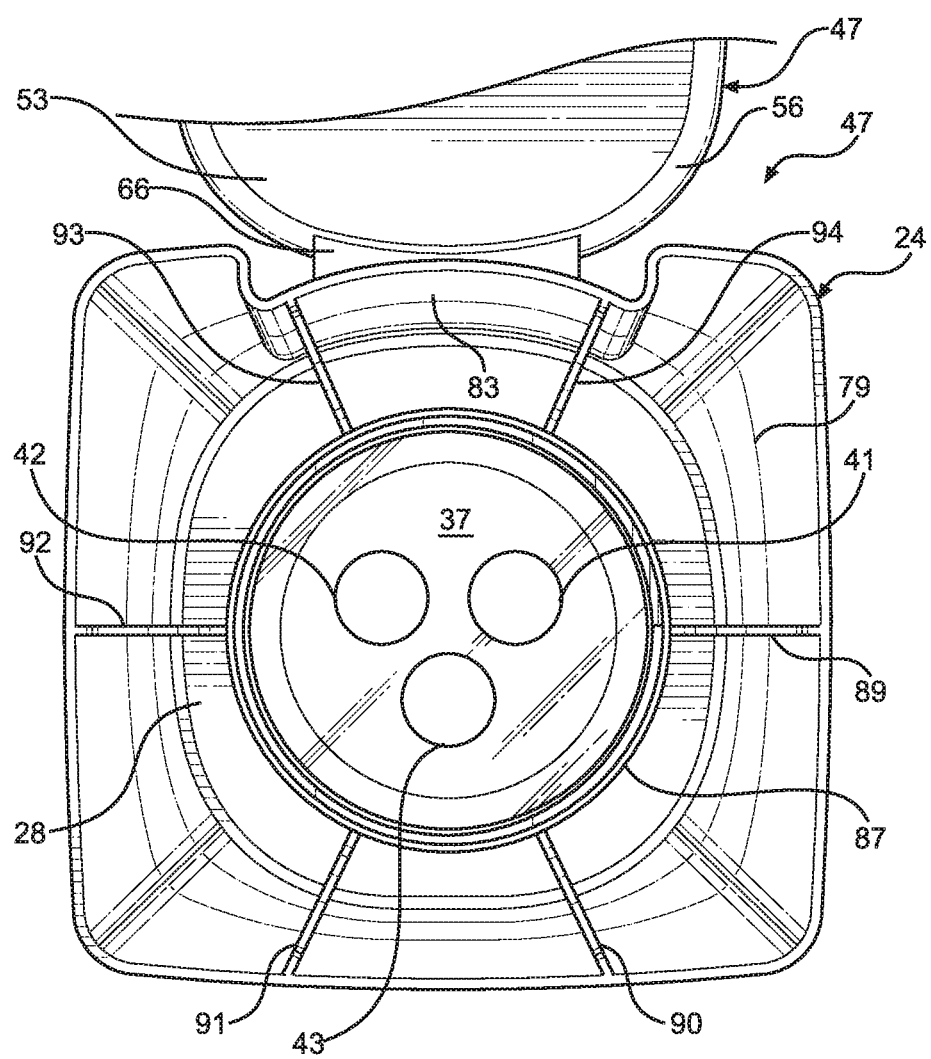
FIG. 2 is an enlarged lower view of the dispensing head of the pet food package of FIG. 1.

For the sake of completeness, FIG. 2 shows additional details of dispenser head assembly 20. As indicated above, depicted here is an enlarged lower view of the dispensing head assembly 20 which better illustrates curved side walls 79 associated with base plate 24, with side walls 79 including an indented region 83 accommodating hinge member 66. Opposite central ring 32 is an internal support ring 87. For structural integrity purposes, a plurality of fins 89-92 extend between side walls 79 and support ring 87, as well as additional fins 93 and 94 between indented region 83 and internal support ring 87.

At this point, it should be understood that the entire construction of dispenser head assembly 20, aside from the inclusion of multiple, appropriately arranged exit ports, is exemplary only and a wide range of dispenser designs could be employed. The same can be said for container body 8, aside from the flexible, i.e., deformable, construction. For instance, with this construction, packaging container 5 is intended to be supported on cap 47, with container body 8 inverted from the position shown, during storage, such as initially on a grocery store shelf and then subsequently on a refrigerator shelf after being purchased by a consumer and opened. However, just by way of examples, packaging container 5 could be supported in other ways, such as with lower body portion 12 of container 8 being gusseted for support on a flat surface, and other sealing arrangements could be employed, such as a screw cap. If fact, the exemplary container embodiment disclosed is analogous in many respects to known containers for other non-pet food products including sour cream.

Figure 3:
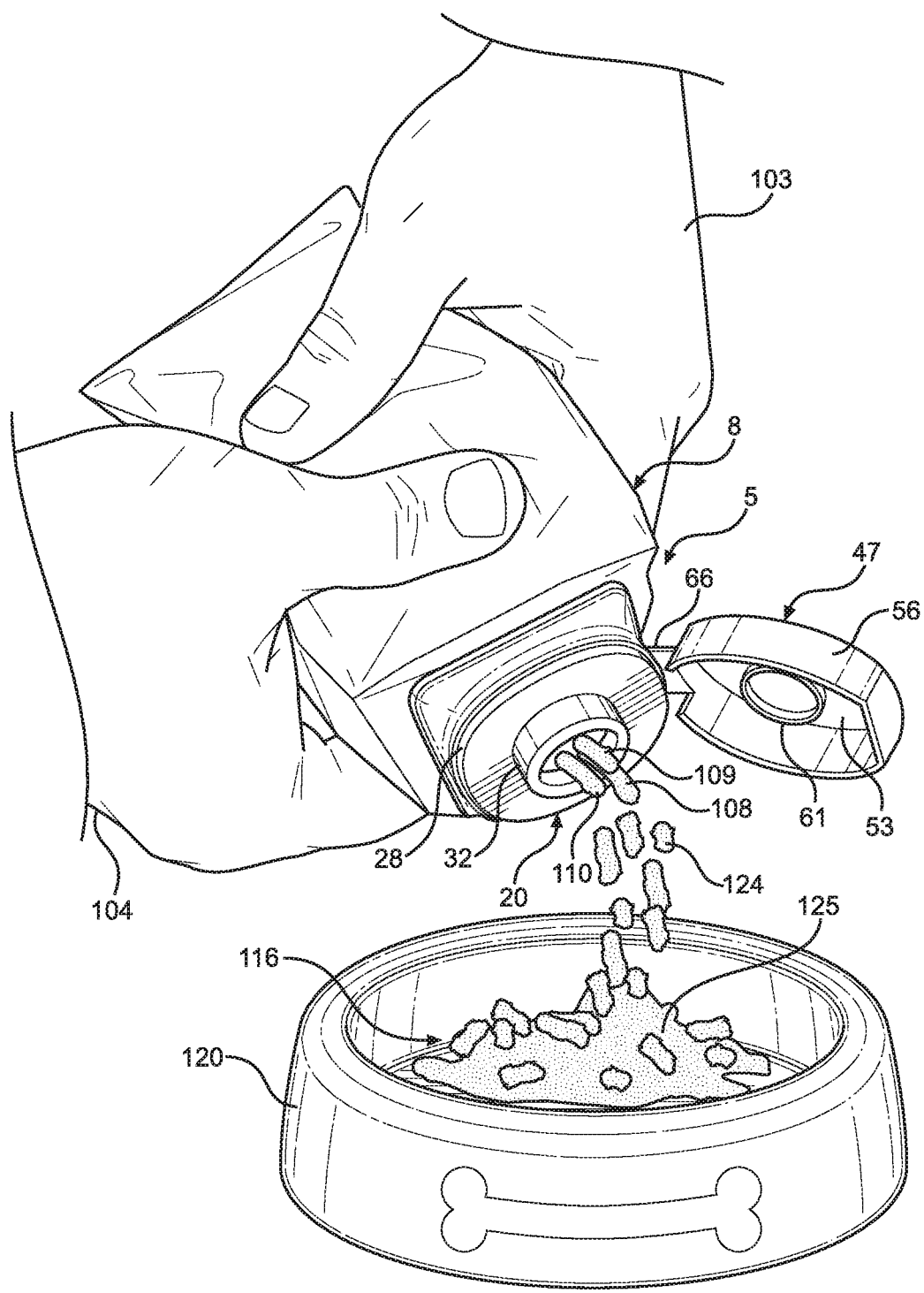
FIG. 3 illustrates the dispensing of wet pet food from the package of the invention into a pet food bowl.

FIG. 3 depicts wet pet food 74 being dispensed from storage chamber 71 of packaging container 5 through the deformation of flexible container body 8. That is, as identified above, container body 8 is readily deformable. For purposes of the present invention, by "readily deformable" it is meant that a user can deform container body 8 by hand, i.e., using one or both hands (see hands 103 and 104 in FIG. 3) and without any tools, without requiring an above average amount of strength. Therefore, body portions of container body 8 can be pushed together in order to collapse storage chamber 71, thereby reducing the volume of storage chamber 71 and causing wet pet food 74 to be forced out of exit ports 41-43 as wet pet food extrudates 108-110 and into, for example, a receiving portion 116 of a dog bowl 120. Particularly advantageously, the heavy, wet nature of pet food 74, along with the relative sizing and position of exit ports 41-43, causes pet food extrudates 108-110 to automatically break apart into rather short, randomly sized strands such as indicated at 124 and 125. In particularly preferred embodiments, a diameter of each exit port 41-43 is between 2/16-3/16 inches, most preferably approximately 1/8 inches, while adjacent exit ports 41-43 are spaced approximately 1/2 or less of the diameter. Given the consistency of the pet food and at least the size of each exit port 41-43, a majority of the short extrudate strands 124 and 125 range between 1/4 and 1/2 inches in length. As a result, the user can dispense the wet pet food 74 without a utensil and without needing to subsequently manually chop the dispensed food. After dispensing, cap 47 can be readily sealed to central ring 32, enabling packaging container 5 to be appropriately stored in a sealed fashion between uses.

Based on the above, it should be readily apparent that the present invention provides a way for consumers to serve wet pet food entirely without the need to use a utensil. While certain preferred embodiments of the present invention have been set forth, it should be understood that various changes or modifications could be made without departing from the spirit of the present invention. In particular it should be noted that the exit ports in the bottom wall need not be circular, but rather can also be polygon in shape. In addition, the bottom wall need not be stationary, but could actually spin during dispensing, such as by the dispensing food co-acting with the shape and structure of the holes themselves to cause the rotation. Furthermore, multiple bottom walls could be employed, such as one being rotatable and one fixed, with the pet food being squeezed through respective holes when aligned. In general, the invention is only intended to be limited by the scope of the following claims.

The inventioned claimed is:

1. A packaged wet pet food product comprising:
   a flexible container body defining a storage chamber;
   a wet pet food product in at least a portion of the storage chamber; and
   a dispenser head assembly including a plurality of exit ports leading from the storage chamber, wherein the flexible container body is configured to be readily deformable by a hand of a user to reduce a volume of the storage chamber and cause the wet pet food product to be extruded from the plurality of exit ports, and wherein the plurality of exit ports are configured such that the wet pet food will automatically break apart into short, randomly sized extrudate strands upon exiting.

2. The packaged wet pet food product of claim 1, wherein the plurality of exit ports comprises at least three.

3. The packaged wet pet food product of claim 1, wherein the wet pet food is wet cat food or wet dog food typically packaged in cans.

4. The packaged wet pet food product of claim 3, wherein the wet pet food contains 60% or greater water.

5. The packaged wet pet food product of claim 1, wherein a diameter of each of the plurality of exit ports is between 2/16-3/16 inches.

6. The packaged wet pet food product of claim 5, wherein each of the plurality of exit ports is approximately ⅛ inches in diameter.

7. The packaged wet pet food product of claim 5, wherein adjacent ones of the plurality of exit ports are spaced approximately ½ or less of the diameter.

8. The packaged wet pet food product of claim 1, wherein the dispenser assembly further includes a cap for selectively sealing the storage chamber between uses.

9. The packaged wet pet food product of claim 1, a majority of the short extrudate strands range between ¼ and ½ inches in length.

10. A method of serving a wet pet food product from a packaging including a flexible container body, defining a storage chamber containing the wet pet food product, and a dispenser head assembly including a plurality of exit ports leading from the storage chamber, the method comprising:
   reducing a volume of the storage chamber by manually deforming the flexible container body to cause the wet pet food product to be extruded from the plurality of exit ports; and
   automatically breaking up the wet pet food product, upon being extruded, into short, randomly sized extrudate strands.

11. The method of claim 10, wherein a majority of the short extrudate strands range between ¼ and ½ inches in length.

12. The method of claim 10, wherein the wet pet food product is extruded through at least three exit ports.

13. The method of claim 10, wherein the wet pet food product is wet cat food or wet dog food typically packaged in cans.

14. The method of claim 13, wherein the wet pet food product contains 60% or greater water.

15. The method of claim 10, wherein a diameter of each of the plurality of exit ports is between 2/16-3/16 inches.

16. The method of claim 15, wherein each of the plurality of exit ports is approximately ⅛ inches in diameter.

17. The method of claim 15, wherein adjacent ones of the plurality of exit ports are spaced approximately ½ or less of the diameter.

18. The method of claim 10, further comprising sealing the storage chamber with a cap of the dispenser head assembly between servings.

\* \* \* \* \*